Figure 4:
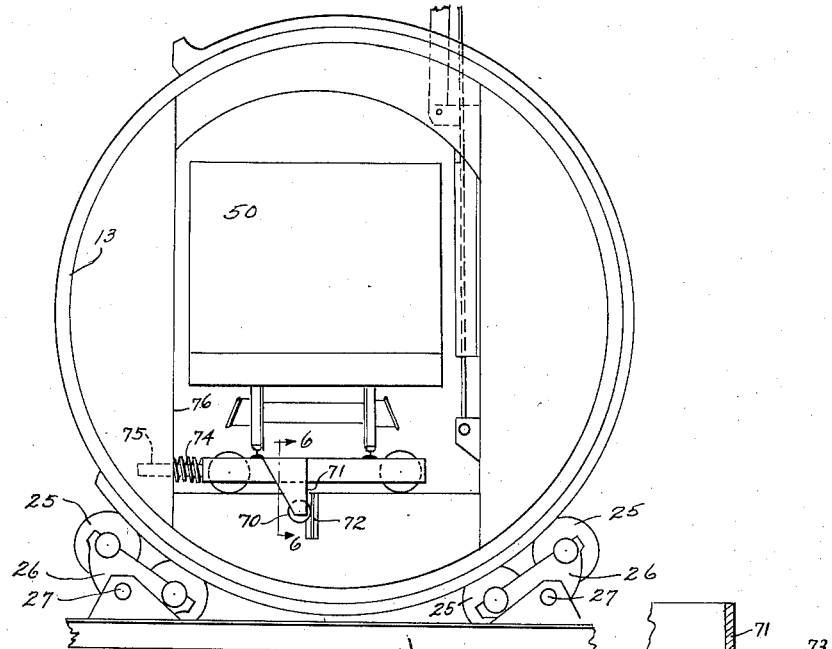

July 24, 1934.　　　R. W. KALTENBACH　　　1,967,246
CAR DUMPING APPARATUS
Filed Nov. 29, 1929　　　8 Sheets-Sheet 1
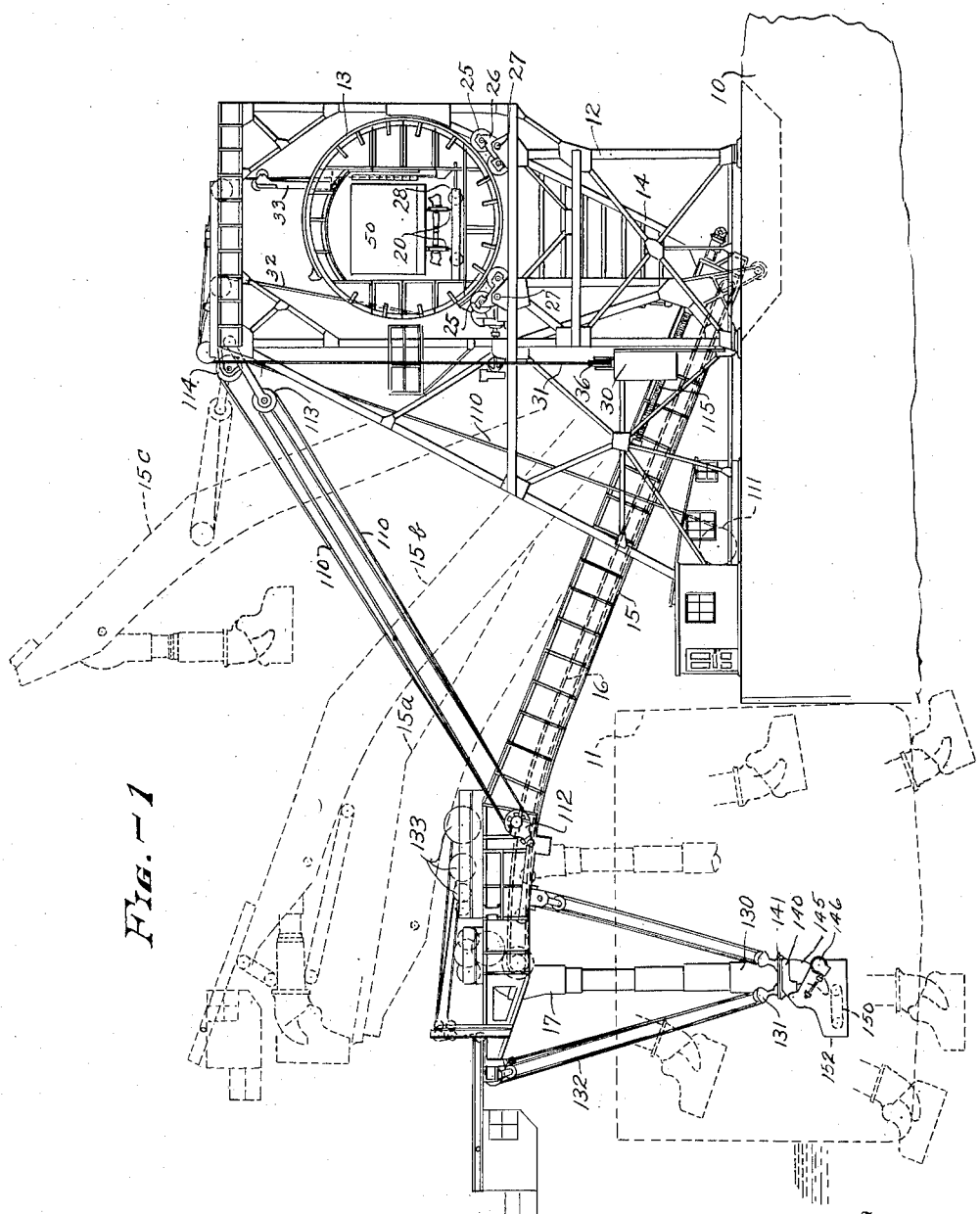

July 24, 1934.  R. W. KALTENBACH  1,967,246
CAR DUMPING APPARATUS
Filed Nov. 29, 1929   8 Sheets-Sheet 2
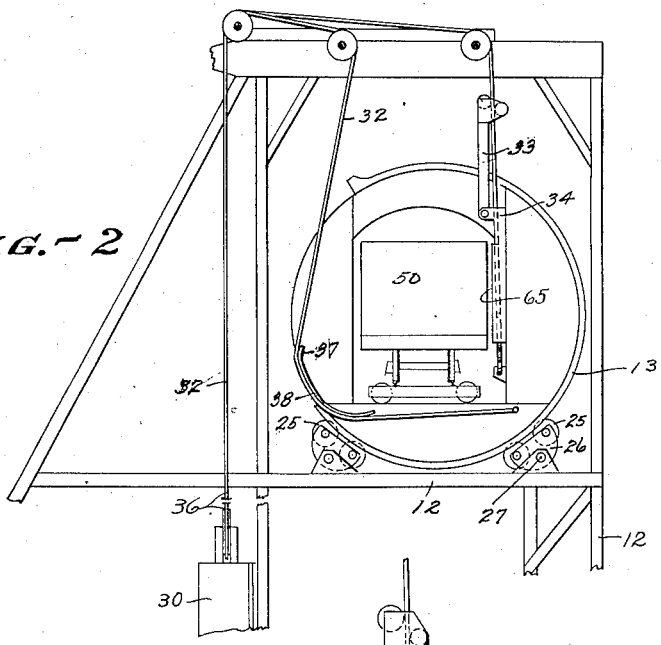
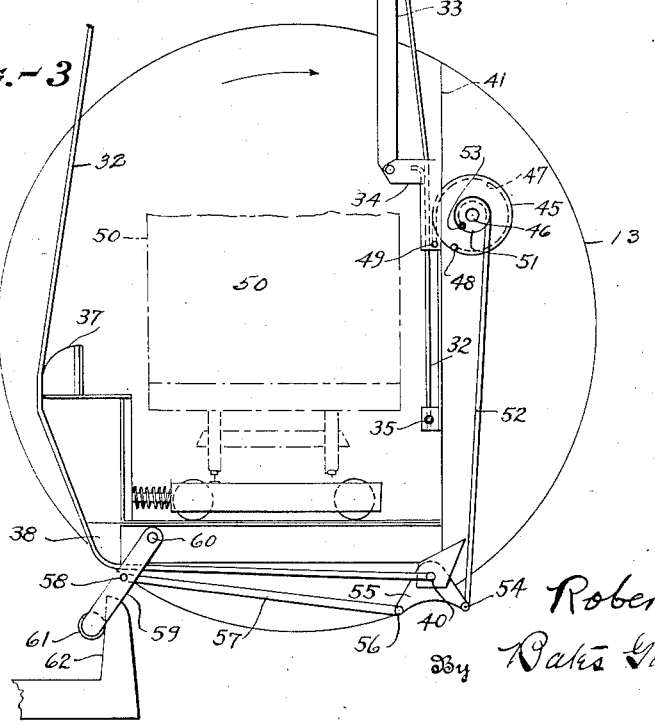
Inventor
Robert W. Kaltenbach,
By Bates Goldrick Mean,
Attorneys.

July 24, 1934.  R. W. KALTENBACH  1,967,246
CAR DUMPING APPARATUS
Filed Nov. 29, 1929   8 Sheets-Sheet 3

Inventor
Robert W. Kaltenbach,
By Baker, Galbrick & Teare,
Attorneys

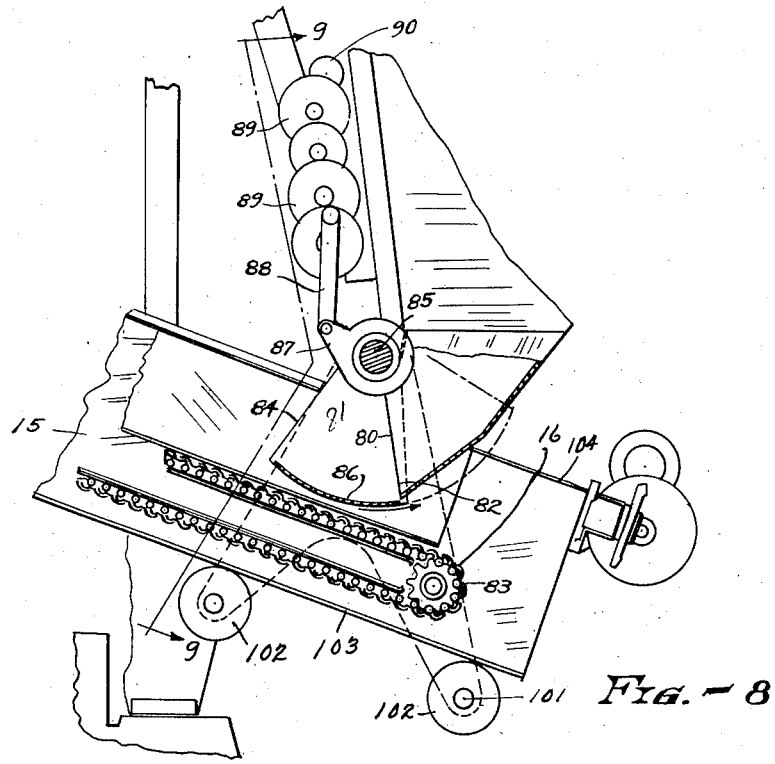

July 24, 1934.  R. W. KALTENBACH  1,967,246
CAR DUMPING APPARATUS
Filed Nov. 29, 1929    8 Sheets-Sheet 6
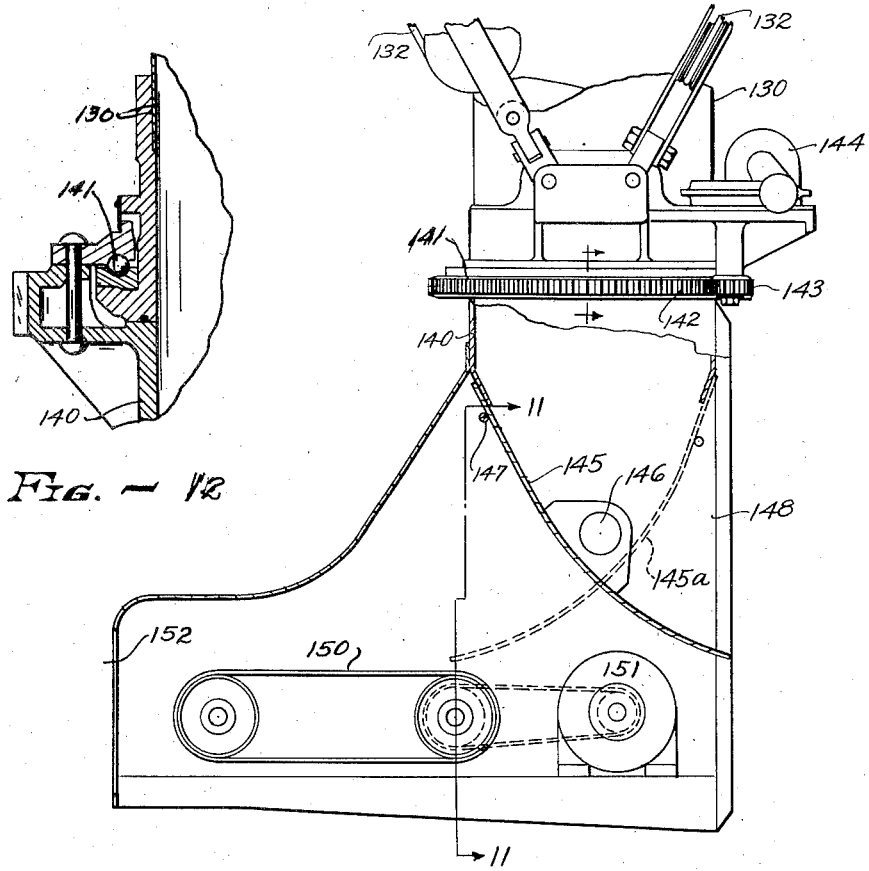
FIG. — 12
FIG. — 10
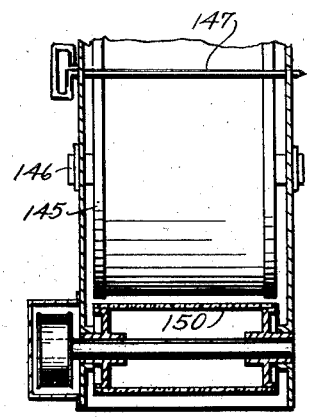
FIG. — 11
Inventor
Robert W. Kaltenbach
Attorneys July 24, 1934.  R. W. KALTENBACH  1,967,246
CAR DUMPING APPARATUS
Filed Nov. 29, 1929   8 Sheets-Sheet 7
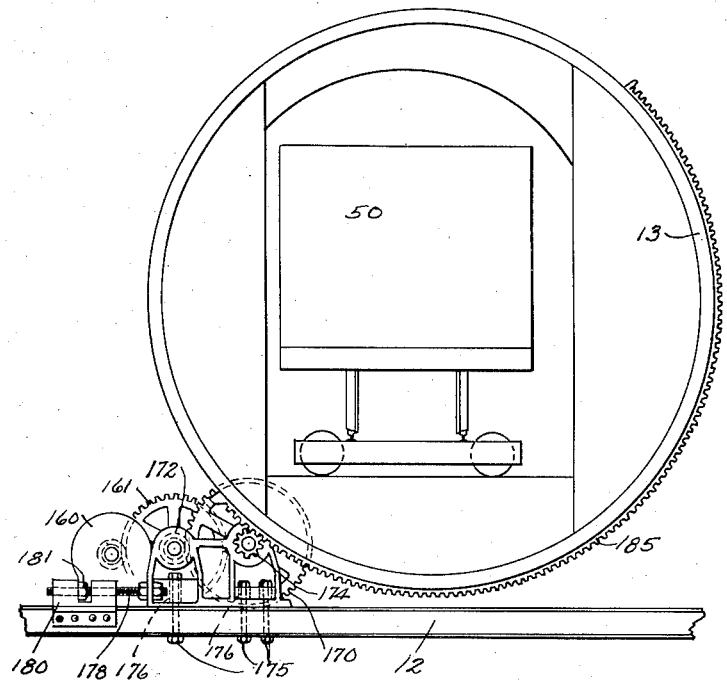
Fig. — 13
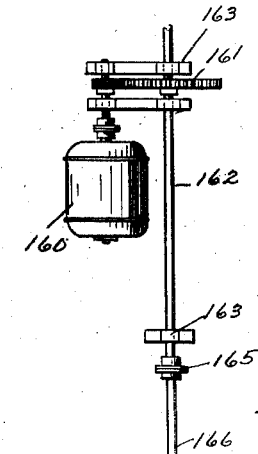
Fig. — 14
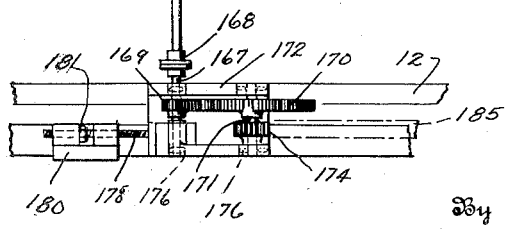
Inventor
Robert W. Kaltenbach
By
Attorneys July 24, 1934.  R. W. KALTENBACH  1,967,246
CAR DUMPING APPARATUS
Filed Nov. 29, 1929   8 Sheets-Sheet 8
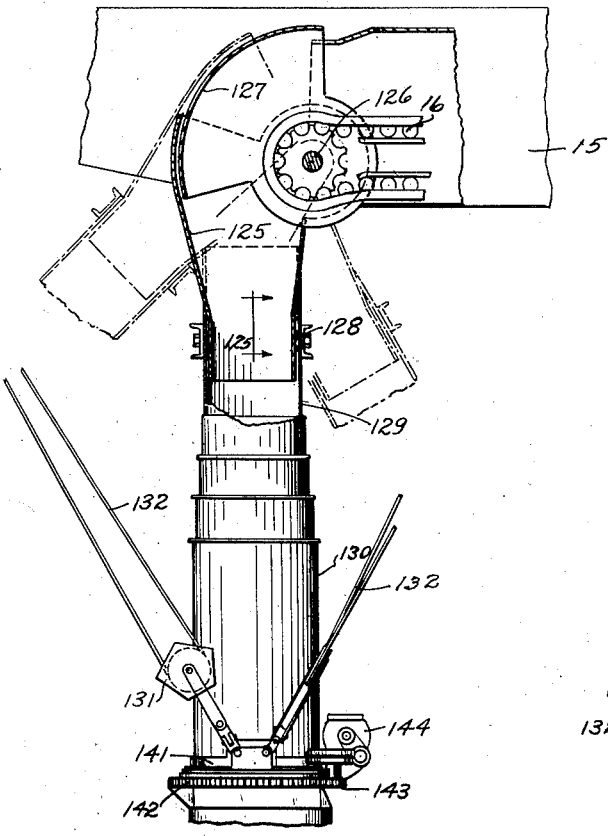
FIG.—15
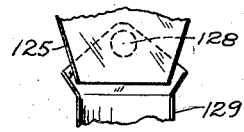
FIG.—16
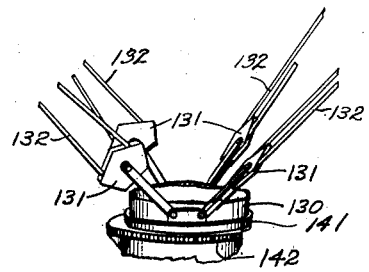
FIG.—17
Inventor
Robert W. Kaltenbach,
By Bates, Goldrick & Fear
Attorneys Patented July 24, 1934

1,967,246

UNITED STATES PATENT OFFICE 1,967,246

CAR DUMPING APPARATUS

Robert W. Kaltenbach, Cleveland, Ohio

Application November 29, 1929, Serial No. 410,421

16 Claims. (Cl. 214—46)

This invention relates to car dumpers, and particularly to those which are adapted to invert a railroad car so as to empty the contents thereof. Devices of this type are usually applied for transferring material from a railroad car to other transportation devices, and particularly to barges and other vessels. Heretofore, one form of such device has had a chute in the form of a pan which led downwardly from the dumper and converged toward the outlet so as to direct the contents into the hold of a vessel. These chutes are shallow pans, but are objectionable, as they do not readily permit the momentary interruption of the flow of contents into the vessel, after the coal enters the pan. It is desirable however, to provide an apparatus by means of which a car may be inverted and then replaced in the cradle by another car, without requiring the first car to be inverted slowly until the entire contents are deposited in the pan. In other words, it is desirable to run a car into the cradle, invert the cradle as quickly as possible, return it to the normal position, and then remove the car independently of the amount of coal which may be in the chute. It is also desirable to provide apparatus for maintaining a continuous flow of material while directing it into the various parts of a vessel and to avoid the necessity for manual trimming of the load. By maintaining a continuous discharge of material breakage of the material, particularly coal, is minimized.

An object of the present invention, therefore, is to provide a car dumper which will permit a barge or vessel to be quickly and continuously loaded, and which will provide for flexible control of the position of the outlet at the point of discharge so as to direct the material wherever desired within the vessel. A further object is to provide an apparatus by means of which the flow into the vessel may be selectively controlled for permitting continuous or intermittent loading, notwithstanding the fact that the car inverting operation is an intermittent operation.

I carry out the above objects by providing a hopper into which the contents of the car is discharged. The contents of the hopper is discharged onto an endless belt which is disposed within a boom that extends laterally from the hopper. Near the end of the boom, I provide a discharge chute into which the material flows, as it falls off the end of the conveyor belt. Provision is made for manipulating the boom with reference to the hopper, and for manipulating the discharge chute with reference to the boom, so as to place the discharge outlet in any desired position. With this arrangement, the flow at the discharge outlet may be controlled merely by controlling the speed of the belt, and if desired, the flow may be continuous, notwithstanding the fact that there is an intermittent filling of the hopper.

Further objects of my invention, include refinements of construction of the operating mechanism so as to facilitate the movement of the various parts, particularly the clamping mechanism, the boom operating mechanism, and the discharge chute control mechanism.

Figure 6:
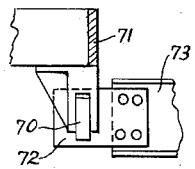
Figure 5:
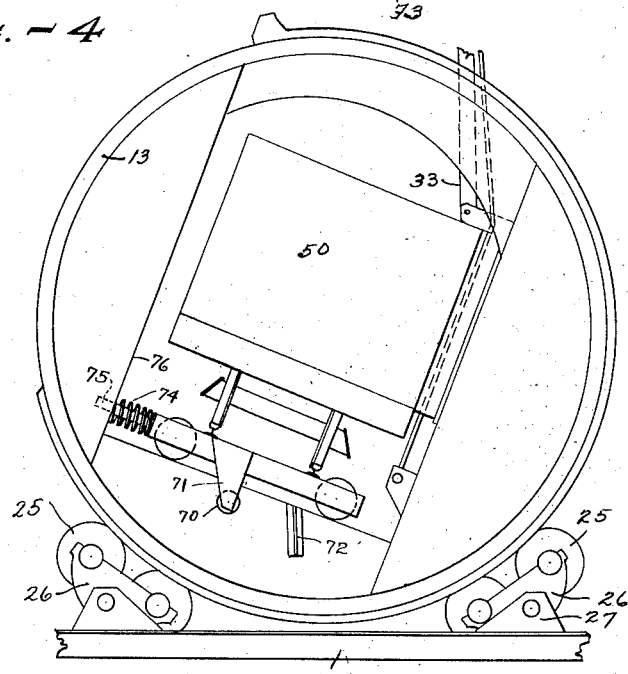
Figure 7:
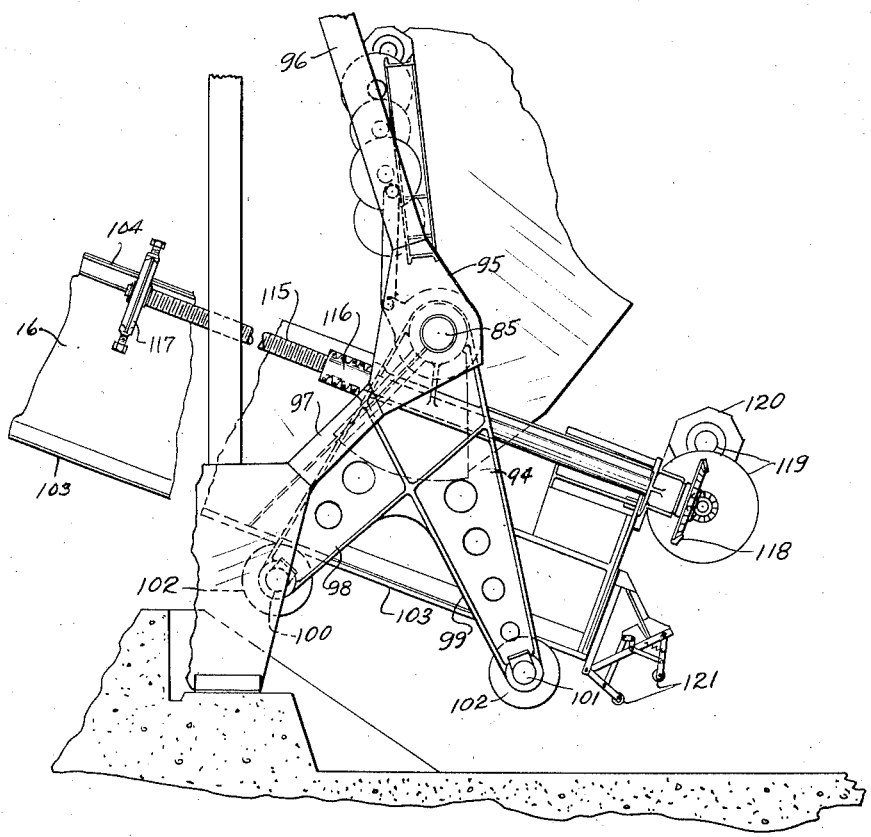

Referring now to the drawings, Fig. 1 is an elevation of a car dumper embodying my invention; Fig. 2 is an end elevation of the cradle; Fig. 3 is a similar elevation showing the arrangement of apparatus for operating the clamp; Fig. 4 is an end view showing the means for holding the platen in the normal position; Fig. 5 is an end elevation showing a different position of the mechanism illustrated in Fig. 4; Fig. 6 is a section taken on a plane indicated by the line 6—6 in Fig. 4; Fig. 7 is an elevation on an enlarged scale showing the manner of supporting the lower end of the boom; Fig. 8 is a vertical section taken longitudinally through the lower end of the hopper end boom; Fig. 9 is an elevation taken on the line 9—9 in Fig. 8; Fig. 10 is a vertical section taken on an enlarged scale through the end of the discharge chute and Fig. 11 is a section taken on the line 11—11 in Fig. 10; Fig. 12 is a sectional detail of the portion of the discharge chute; Fig. 13 is an end elevation on an enlarged scale of the cradle and its driving mechanism; Fig. 14 is a plan of the driving mechanism for the cradle; Fig. 15 is an enlarged detail of the discharge chute, some of the parts being shown in section; Fig. 16 is a section taken on a plane indicated by the lines 16—16 in Fig. 15 and Fig. 17 is a fragmentary perspective showing the manner of supporting the lower end of the discharge chute.

I have illustrated my car dumper as positioned upon a pier 10, and as arranged to load a barge or vessel 11, which is positioned alongside the pier. A supporting frame is shown as being mounted upon the pier, and as comprising a fabricated structure of conventional design. The frame is indicated in general at 12, and is shown as supporting a cradle 13, a hopper 14, and a boom 15. The boom is a hollow box-like member which carries a conveyor belt 16, and which is used for conveying the material from the hopper and outwardly to the end of the boom. A chute 17 receives the material as it passes from the belt and conducts it downwardly and then discharges it at the desired location. Approach and run-off tracks lead upwardly from the pier to the cradle and align with the cradle tracks 20. The cradle, as I have shown, is of a form usually employed for a rotary car dumper wherein the axis of the cradle remains in the same position during the dumping operation. To this end, the cradle is illustrated as being supporting on wheels 25, which are journalled in brackets 26 on opposite sides of the center of the cradle. The brackets in turn are pivotally mounted as at 27 on the frame. The cradle carries a platen 28 on which the tracks 20 are mounted, and mechanism is then provided for moving the platen laterally and into engagement with the customary buffer blocks. Mechanism is also provided for clamping the car onto the cradle during the rotating operation.

The rotation of the platen is accomplished by means of a suitable motor 160, secured by the frame 12 to the car dumper. This motor, through suitable gearing 161 drives a line shaft 162, journaled in bearings 163 secured to the frame. This line shaft is joined at either end with a shaft 166 by means of suitable flexible couplings 165, one of which is shown in Fig. 13. The shafts 166 are in turn joined to shafts 167 by means of suitable flexible couplings 168. Each shaft 167 is carried in a suitable bearing member 172 secured to the frame, as hereinafter described. The shaft 167 carries a spur gear 169 which meshes with a gear 170 carried by a countershaft 171 journaled in the bearing member 172. The counter shaft 171 also carries a pinion 174 which in turn meshes with the segmental ring gear 185 rigidly secured to the rotating carriage or cradle 13. It will be seen from the following that the motor 160 will serve to rotate the cradle. As the cradle is of considerable length, it is found necessary to provide means of adjustment for the pinion 174 so that it may readily mesh with the segment 160 under all operating conditions. This is preferably accomplished by mounting the bearing member 172 upon the frame in such a manner that it may be shifted. As shown, the bearing 172 is secured to the frame by means of bolts 175 which pass through slotted openings 176 in the bearing member and a suitable adjusting screw 178 is rigidly secured to the bearing member and passes loosely through a lug member 180 secured to the frame 12, to the end that the bearing may be thrust forward, moving the pinion 174 into meshing position with the gear member 185. When the gears are in meshing position, the adjusting screw 178 is locked by means of a suitable lock nut 181.

The weight of the cradle and a part of the load is counteracted by weights 30, which are arranged in a row alongside the frame, and which are connected by cables 31 to the cradle. There are preferably four sets of counterweights and cables, and in each case, one end 32 of the cable as shown in Fig. 3, extends downwardly through the clamping member 33, and thence behind clamp 34, and is then anchored to the cradle as at 35. From the clamping member the cable passes around sheaves located at the top of the frame, and thence downwardly around a pulley 36, which is attached to the counterweight, and thence upwardly over guide sheaves at the top of the frame, and then downwardly and around guideways 37 and 38 on the cradle and is then anchored to the cradle around a pin 40. Thus it is apparent that the counterweights and cables function not only to counterbalance the weight of the cradle, but also to clamp the car to the rails during the dumping operation.

The clamp 34 and its associated bar 33 are slidably mounted in a vertical wall 41 of the cradle. The clamping members are arranged to move downwardly under the action of gravity when it is desired to effect the clamping operation. Mechanism is then provided to move the members out of engagement with the car near the end of the return operation.

The mechanism which I employ for releasing the clamps preferably comprises a sheave 45, which is rigidly mounted upon a shaft 46. A cable 47 extends around the sheave, and has one end anchored thereto at 48, and the other end attached to the clamp at 49. The shaft 46 is journalled in the cradle on the side of the wall 41 opposite the clamp, and an opening is provided in the wall through which the cable 47 and part of the sheave may extend. In the position shown in Fig. 3, the sheave 45 is holding the clamp out of contact with the car 50.

To operate the sheave 45, I have shown a drum 51, which is also rigidly mounted on the shaft 46 and which has one end of a cable 52 anchored thereto at 53. The other end of the cable is connected at 54 to a bell crank lever 55. Such lever is shown as being pivotally mounted on the cradle at 40 and as having the other end thereof pivotally connected at 56 to a link 57, which in turn is pivotally connected at 58 to a lever 59. One end of the lever in turn is pivotally mounted at 60 on the cradle, and is provided at the other end with a roller 61, which is adapted to engage an abutment at 62 on the frame. The arrangement of this system of levers and cables is such, that in the position shown in Fig. 3, the roller 61 bears against the abutment and acts upon the shaft 46 to wind up the cable 47 on the sheave 45, and thereby to hold the clamp out of contact with the car, as the cradle then starts to turn in the direction indicated by the arrow in Fig. 3, the roller 61 tends to leave the abutment, and the clamp tends to descend under the action of gravity.

The inclination of the abutment 62 with reference to the vertical is adjusted to permit a uniform downward motion of the clamp during the initial return movement of the cradle. On the return movement, the roller strikes the abutment before the cradle is in the normal position, whereupon continued rotation with the cradle toward the normal position causes a downward pull on the cable 52, and a corresponding upward pull on the cable 47. This results in an upward movement of the clamp.

Normally the platen is in the position indicated in Figs. 1, 2 and 3 wherein the side of the car is out of contact with the buffers 65, which are carried on the cradle wall 41. To hold the platen in such position, I provide a roller 70 which is journalled in a bracket 71 at each end of the platen (see Figs. 4 and 5). The rollers in turn are adapted to engage an abutment 72 which is carried by the superstructure 73 for the approach and runoff tracks respectively. When the cradle is in the normal position, the rollers come into contact with the abutment and springs 74 are compressed. There are a plurality of such springs and each is shown as surrounding a bar 75, one end of which is affixed to the platen and the other end of which is slidably mounted through an opening in a wall 76 of the cradle. Thus, as the cradle is rotated to empty the contents of a car, the rollers 70 tend to leave the abutments 72, thus permitting the springs 74 to expand, and aided by gravity they carry the platen laterally until the car engages the buffer blocks. Conversely, during the return movement, the rollers 70 engage the abutments before the cradle reaches the normal position, and the parts are so arranged that such engagement is effected after the rollers 61 are acted upon by the abutments 62 to release the clamp. Continued return movement then serves to compress the springs 74.

The hopper 14 has the upper end thereof sufficient in size to accommodate the longest car, which is capable of being handled on the cradle. The walls of the hopper then converge downwardly until the discharge outlet 80 is sufficiently restricted to enter the passage 81 in the boom. As shown in Fig. 8, the bottom wall of the hopper terminates at 82, at a point forward of the lower reach 83 of the layer belt. A gate is associated with the discharge end of the hopper for restricting the effective area and thereby for controlling the flow of material from the hopper and onto the belt.

The hopper control gate preferably comprises a U-shaped member, the arms of which are indicated at 84 as being pivotally mounted on the shaft 85 and the intermediate portion 86 of which comprises a curved member which extends across the opening 80. The curvature of the intermediate portion maintains a close fit with the end of the hopper, while the gate is being moved. To operate the gate, I have shown each arm 84 as having an ear 87, which is pivotally connected to a pitman 88, which in turn is connected to a crank arm 91. Such crank arms are then operatively connected through gearing 89 to an electric motor 90, which is shown as being mounted on the hopper. Thus, when the motor is operated, the gate is swung about the axis of the shaft 85 with the result that the flow of material from the hopper is either restricted or enlarged. The use of cranks and pitmans for operating the gate is desirable, as the gate is automatically locked in either extreme position by the dead center position of the crank. In Fig. 6, the gate is shown in full lines, as being in the position to restrict most effectively the flow of material from the hopper.

To support the boom and to permit maximum range of movement, I provide a saddle which is carried by the frame and in which the lower end of the boom is adjustably mounted. The outer end of the boom is supported by a cable which leads downwardly from the top of the frame.

Referring now to this construction more in detail, and particularly to Figs. 7 and 9, the ends of the shaft 85 are shown as being journalled in brackets 95, which are disposed on opposite sides of the boom and are connected to the frame by upper and lower struts 96 and 97 respectively. A frame 94 is also pivotally mounted on the shaft on each side of the boom, and is provided with arms 98 and 99 which carry shafts 100 and 101 respectively at the lower ends thereof. Each shaft carries rollers 102, which are adapted to engage trackways 103 at the bottom of the boom. Directly above such trackways are other tracks 104 which are positioned on the top surface of the boom, and which are adapted to be engaged by rollers 105 on the shaft 85. This supporting construction thus causes the boom to be pivoted about the shaft 85.

To move the boom about the pivot shaft 85, I have shown in Fig. 1 a single cable 110, the ends of which are attached to drums 111 and the intermediate portions of which are reaved between sheave blocks 112, which are positioned on opposite sides of the boom, and sheaves 113 and 114 to the upper part of the frame. While I show only one drum, in reality, I employ two drums respectively in axial alignment and arranged to be operated simultaneously, so that when the cables are wound in, the boom is raised and as they are paid out, the boom is lowered. Various illustrative positions which may be obtained by the boom are indicated by the broken lines 15a, 15b and 15c in Fig. 1.

In addition to the pivotal movement, the boom can be racked longitudinally, thus adding materially to the flexibility of control without substantially altering the vertical position of the discharge outlet. The mechanism, which I have shown for effecting such longitudinal movement is best shown in Figs. 1 and 7 and comprises threaded shafts 115, which are rotatably mounted on each side of the boom adjacent the lower end thereof, and which are adapted to extend through a correspondingly threaded passageway 116 in the "a" frame 94. The outer end of each shaft is suitably journalled in a floating bearing 117, while the lower end is connected as by gearing 118 and 119 to an electric motor 120. This suspension of the screw shafts 115 places them under tension. The motor 120 is shown as being mounted upon the boom adjacent the lower end thereof. Automatic control devices are indicated in general at 121 for shutting off the motor in the event that the operator should fail to stop the movement of the boom at the proper time.

The discharge chute, heretofore described in general at 17, preferably comprises a plurality of interfitting parts, through which the material is lead from the conveyor 16, and by means of which the material may be directed a substantial distance from the end of the belt without altering the position of the boom. This, I accomplish as shown in Fig. 14, by providing a sleeve 125 which is pivotally mounted on a shaft 126 and carried by the boom which is adapted to receive the material, as it passes off the belt 16, and is deflected downwardly by a guard 127. The lower end of the sleeve enters and is pivotally connected at 128 to the upper end of the tubular chute member 129. The pivot 128 extends at right angles to that indicated at 126 as shown in Figs. 14 and 15, thus providing a universal movement for the chute with reference to the boom.

The chute, as illustrated, comprises a plurality of telescopic tubular members, the lower and outer one of which is indicated at 130 and is arranged to support sheaves 131, through which cables 132 are adapted to extend. Such cables are arranged to be operated by electric motors, indicated in general at 133 at the upper end of the boom. The control arrangement is such that the groups of cables on opposite sides of the chute can be operated simultaneously so as to swing the lower end of the chute about either of the pivots 126 or 128. In addition, all of the cables can be operated simultaneously to permit the telescopic tubes to extend, or to retract them as desired.

Adjacent the lower end of the member 130, I provide an apparatus for directing the flow of material horizontally from the chute. Such apparatus is best shown in Figs. 1, 10 and 14, and comprises a hollow casing 140, which is rotatably journalled at 141 to the lower end of the member 130 and which carries a gear 142 which is adapted to mesh with a pinion 143 (see Figs. 10 and 12). An electric motor 144 on the member 130 is arranged to rotate the pinion. Thus, when the motor is operated, the discharge casing 140 is rotated with reference to the chute. The flow of material from the casing is governed by the position of a gate 145, which comprises a curved plate pivotally mounted at 146 within the casing. A pin 147 is removably positioned across the casing and is adapted to hold the plate in the desired position.

The deflector plate in Fig. 10 is in position to direct the flow of material through the passageway 148 and directly into the barge or vessel. When the gate is in the position shown in the broken lines 145a, the material is directed onto a trimmer, which comprises a conveyor belt 150 and which is mounted within the casing. This belt is arranged to be driven at a relatively high rate of speed by an electric motor 151. When so operated, the material is forcibly ejected from the casing through the passageway 152 and at a considerable distance from the opening. Thus a vessel may be trimmed during the loading operation, thus obviating the necessity for manual trimming of the load.

It is apparent, from the foregoing description that I have provided a car dumper, by means of which material may be discharged continuously into a vessel or barge, while it is being fed intermittently into the hopper. Thus, by making the hopper of sufficient size and by operating the belt at a predetermined speed, the continuous discharge into the vessel can be maintained while allowing ample time for a car to be inverted in the cradle and then replaced by another car. It is also apparent that during the loading operation, the rate of flow may be selectively controlled to suit the requirements of the vessel being loaded, and that it may be immediately discontinued notwithstanding the fact that the material in a car may be in the process of flowing from the car into the hopper.

The results enumerated are advantageous, as a vessel may thus be loaded in a minimum period of time and a car may be dumped and run off the cradle in a minimum period of time. In addition, the relative arrangement of parts makes a flexible control, whereby the various movements may be readily performed during the loading operation and in an expeditious manner.

I claim:

1. In a car dumper having a frame, the combination of a hopper arranged to receive the contents of a car, said hopper extending downwardly and having the lower end thereof formed to provide a lateral discharge opening, a U-shaped gate member pivotally mounted above the opening, and means including a crank pitman for moving the member about said pivot to control the flow of material from the hopper.

2. In a car dumper, the combination of a hopper disposed therebeneath, the bottom of the hopper terminating in a lateral discharge opening, a gate associated with the opening and being adapted to be moved along the bottom of the hopper to form an extension of the bottom beyond the opening, said gate functioning to control the flow of material from the hopper, and mechanism for selectively moving the gate with reference to the hopper.

3. In a car dumper having a hopper, a conveyer boom beneath the hopper, and means for guiding the contents of the hopper onto the conveyor, the combination of a support for said boom comprising a shaft, two pivoted arms, one on either side of the boom, attached to the shaft, rotating members mounted on said shaft bearing on the upper surface of the boom, and rotating members mounted on said pivoted arms and bearing on the under surface of the boom, thereby permitting a tilting and longitudinally shifting motion of the boom with reference to the guiding means.

4. In a car dumper, having a hopper, and a conveyor disposed beneath the hopper, the combination of a threaded member associated with the conveyor and mechanism for rotating the member whereby the conveyor may be shifted longitudinally with reference to the hopper, and a support for the conveyor pivotally carried by the hopper comprising a plurality of surfaces lying in spaced relationship in a plane parallel to the axis of the threaded member.

5. In a car dumper, having a hopper, the combination of a conveyor pivotally supported beneath said hopper, a threaded member mounted on the conveyor, a coacting threaded member associated with the support, and mechanism for rotating the first member whereby the conveyor may be shifted longitudinally of itself with reference to said hopper, said threaded members providing a lock against longitudinal movement of the conveyor when said mechanism is idle.

6. In a car dumper, having a hopper, the combination of a conveyor beneath the hopper pivotally supported intermediate its ends but nearer its inner end, a threaded portion in the pivotal support, a threaded member for shifting the conveyor longitudinally with reference to the hopper, said member being rotatably mounted on the conveyor adjacent its inner end and coacting with the threaded portion in the support, whereby the threaded member is placed in tension.

7. In a car dumper, having a support for a car, a conveyor beneath the support, and means for guiding the contents of a car onto the conveyor, the combination of means pivoted about a horizontally extending axis for supporting the conveyor so as to permit a tilting and longitudinal shifting motion thereof, and longitudinal shifting means pivoted about the same axis as the supporting means and maintaining a constant parallel relationship therewith.

8. In a car dumper, the combination of a hopper, a conveyor disposed beneath the hopper, a threaded member associated with the conveyor for shifting the conveyor longitudinally with reference to said hopper, two arms pivotally supported from the hopper and straddling the conveyor, a plurality of conveyor supports at the extremities of the arms and lying in a common plane, and a threaded portion through the arms adjacent the point of pivotal support and lying in a plane parallel to the conveyor supports for coacting with the threaded member.

9. In a car dumper, the combination of a hopper, a conveyor boom disposed beneath the hopper, a pivot carried by the hopper for mounting the boom so as to permit tilting and longitudinally shifting motion thereof, and guiding and supporting members for the boom contacting the upper and lower surfaces thereof and supported by the pivot.

10. In a car dumper, the combination of a hopper, a conveyor disposed beneath the hopper, pivoted arms carried by the hopper, and a threaded member attached to the pivoted arms and to one end of the conveyor, the vertical component of gravitational forces acting upon the conveyor being resisted by the pivoted arms, and the component of said forces acting along the plane of the conveyor being resisted by the threaded member held in tension between the pivoted arms and the end of the conveyor adjacent thereto.

11. In a car dumper, having a frame, the combination of a hopper arranged to receive the contents of a car, said hopper extending downwardly and having a bottom formed to provide a lateral discharge opening and adapted to support the direct weight of all material in the hopper, a U-shaped gate member pivotally mounted above the opening, and means for moving the member about said pivot to act as an extension of the hopper bottom to support any desired portion of the weight of the material tending to flow through the opening.

12. In a car dumper, the combination of a hopper, the bottom of the hopper terminating in a lateral discharge opening, a gate associated with the opening, said gate being adapted to be moved along and outside the bottom of the hopper to form a lateral continuation of the bottom beyond said opening and said gate being of sufficient extent to support the material tending to flow through the opening when the material is at its angle of repose, and mechanism for selectively moving the gate with reference to the hopper.

13. In a car dumper, the combination of a hopper, the bottom of the hopper terminating in a lateral discharge opening, a closure member for the opening, a conveyor extending laterally from the hopper, and a common pivotal support for the conveyor and the closure member.

14. In a car dumper, having means for supporting a car, the combination of a boom pivotally mounted beneath said means, rotating members at either end of the boom and supported thereby, a conveyor within the boom mounted on the rotating members, a closed discharge conduit adjacent one end of the conveyor, and connecting means between said conduit and conveyor boom comprising a deflecting member and a sleeve member pivotally supported about the rotating member at the end of the conveyor and telescopically fitted to each other, said deflecting member also fitting telescopically with the boom and said sleeve member fitting telescopically with the discharge conduit.

15. In a car dumper, the combination with a frame, a hopper associated with the frame, said hopper being adapted to hold more than the contents of one car, a boom comprising a boxlike member having the lower end thereof disposed about the bottom of the hopper, a conveyor within the boom, said conveyor passing close to the hopper and including a rotary member adjacent the discharge end thereof, means for varying the flow of material from the hopper to the conveyor while maintaining the close spacing between the conveyor and hopper, means adjacent the lower end of the boom for shifting it longitudinally with reference to the frame, a tubular discharge conduit mounted on two pivots for universal movement on the boom adjacent the discharge end of the conveyor, the axis of one of the pivots being coextensive with the axis of said rotary member, means for maintaining a closed connection between the boom and conduit, and mechanism carried by the boom for varying the elevation and direction of the discharge end of the conduit with reference to the boom.

16. In a car dumper, the combination with a hopper having a single centrally located discharge opening adjacent the bottom thereof, a conveyor extending laterally from beneath the hopper opening and carried thereby for longitudinal and pivotal adjustment, the pivotal mounting of the conveyor being above the conveyor so that the distance between the pivot and conveyor is constant in all positions of adjustment, and means for adjusting said conveyor.

ROBERT W. KALTENBACH.